2 Sheets—Sheet 1.
T. & H. FAIRBANKS.
Charing Scales.
No. 82,610.
Patented Sept. 29, 1868.
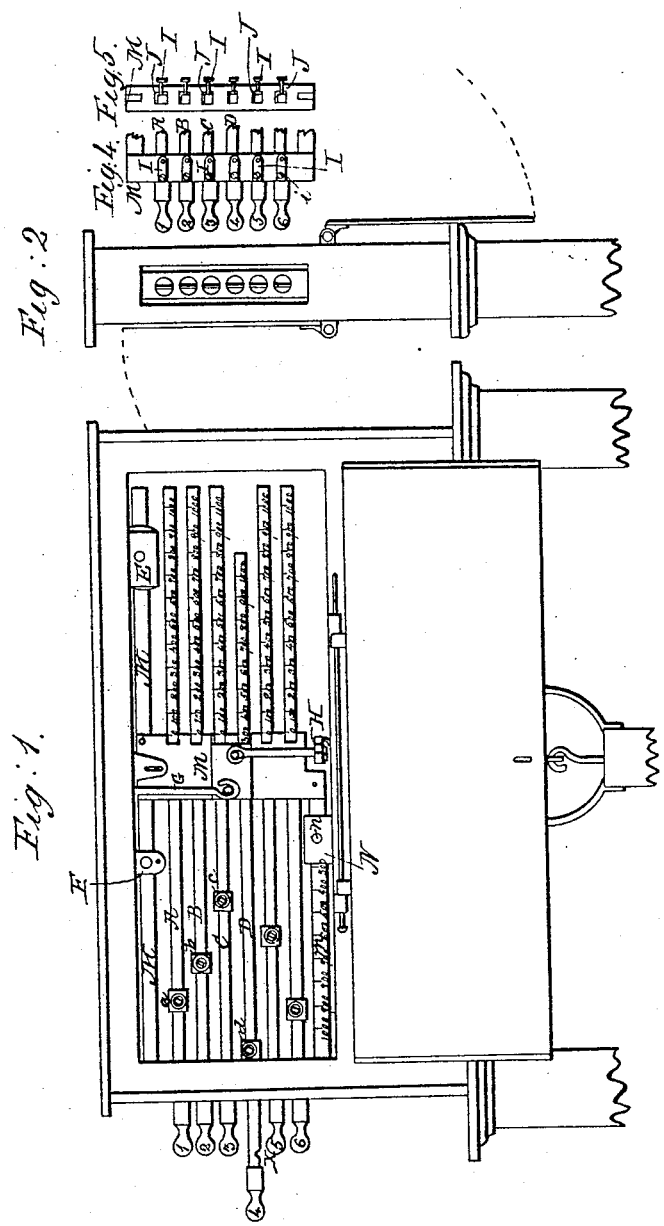

T. & H. FAIRBANKS.
Charing Scales.
No. 82,610.
2 Sheets—Sheet 2.
Patented Sept. 29, 1868.
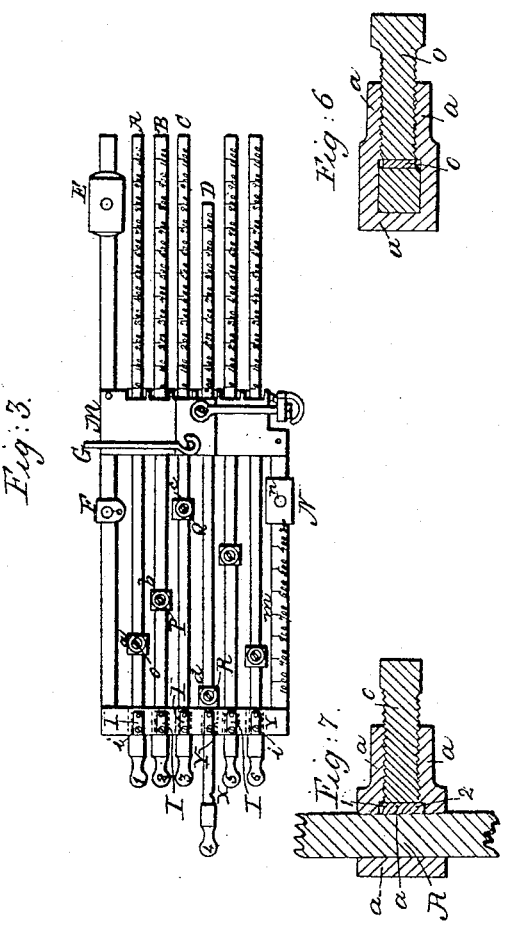
Witnesses
Inventors.

United States Patent Office.

THADDEUS FAIRBANKS, OF ST. JOHNSBURY, VERMONT, AND HENRY FAIRBANKS, OF HANOVER, NEW HAMPSHIRE.

*Letters Patent No. 82,610, dated September 29, 1868.*

IMPROVEMENT IN CHARGING-SCALES.

*The Schedule referred to in these Letters Patent and making part of the same.*

TO ALL WHOM IT MAY CONCERN:

Be it known that we, THADDEUS FAIRBANKS, of St. Johnsbury, in the county of Caledonia, and State of Vermont, and HENRY FAIRBANKS, of Hanover, in the county of Grafton, and State of New Hampshire, have invented certain new and useful Improvements in Charging-Scales, sometimes known as Bridgehouse-scales; and we do hereby declare that the following is a full and exact description thereof.

What are known as charging-scales may be used for various purposes, but the most prominent is the determining the quantities of ore and other materials charged in the blast-furnace, at certain intervals, in smelting iron. It is common to charge, at intervals, a certain quantity of coal, another quantity of lime, and another quantity of iron-ore. In case it is desired to mix ores from different localities, the scales must then be capable of weighing more than the above three different qualities. For example, if there are required to be charged in the furnace four hundred pounds of coal, three hundred pounds of lime, two hundred pounds of red haematite, and two hundred pounds of loadstone or magnetic ore, the scales must be capable of weighing four different quantities. It is common for the director, or the person in charge of this department of the work, to decide on the exact quantity of each, and to instruct inferior workmen to carry out his directions.

Our invention is an improvement on the scale described in the patent issued to A. B. Davis, dated July 30, 1867.

We will first describe what we consider the best means of carrying out our invention, and will afterwards designate the points which we believe to be new therein.

The accompanying drawings form a part of this specification.

Figure 1 is a side elevation of the upper part of the scale-mechanism.

Figure 2 is an end view.

Figure 3 represents the beam detached.

Figure 4 is a side view of one end of the beam.

Figure 5 represents an end view of the same.

Figure 6 is a central section through the adjustable stops, full size; and

Figure 7 is a section through the same in a different plane.

Similar letters of reference indicate like parts in all the figures. Tints are employed merely to aid in distinguishing the parts, and do not necessarily indicate differences of material. The material of the whole may be iron and steel.

M $m$ is the frame, which oscillates or rocks on its knife-edges, or balances exactly, according as the weight on the platform, not represented, is greater, or less, or exactly equal to that required. The part $m$ is graduated, and carries a poise, N, which may be adjusted in any desired position, and allowed to rest there, either with or without the use of the pinching-screw $n$, to hold it firmly in that position. This scale, $m$, is graduated on both sides, and serves to weigh any material on the platform for any purposes, thus allowing the scale to serve the ordinary uses of a platform-scale in addition to its use in the peculiar manner required in weighing, rapidly and exactly, equal charges of the different materials in iron-smelting.

A B C D are straight bars, of a rectangular section, graduated at the end towards the right, and provided with knobs or handles at the opposite ends, where they project through the frame M, by which each of said bars may be moved endwise independently of the others. Each bar is provided with an adjustable stop, $a\ b\ c\ d$, which is readily adjusted and firmly fixed in any desirable position on the bar by means of a pinching-screw, tapped through the stop, as represented. The bars are fitted in corresponding rectangular holes, through the upright parts of the frame M, having a bearing near the knob or handle, and also a bearing in the central part of the frame M, all of which will be obvious.

In the use of our scale, the uppermost stop, $a$, is fixed by its set-screw in such a position that when the bar A is drawn to the left until its stop $a$ strikes against the inside of the frame M on that side, the entire frame M and its connections possesses such a tendency to tilt to the left that it is exactly balanced by the proper weight of the coal on the platform of the scale. With the parts thus adjusted, a wheel-barrow of coal is weighed, the workman adding to or taking from the load until the lever M is balanced. The charge of coal being then deposited in the furnace, the attendant next brings a charge of lime, and, having placed it on the platform, returns the bar A to its first position, and draws to the left the bar B until its stop $b$ strikes the end of the frame M on the left side. With the parts thus adjusted, the quantity of limestone is increased or diminished on the barrow until the lever just balances, and thus the operation is repeated.

It will of course be understood that the kind of materials weighed, and the quantities, and the order in which different materials and different quantities are weighed, may be varied indefinitely within the range of the capacity of the scale.

The patent of Mr. Davis, above referred to, employed bars moved in the same manner as ours, but our arrangement of the bars distributes a large portion of the weight on each side of the centre of motion of the lever M, and thus avoids the necessity for a large counterbalance-poise, which is required in the Davis scale.

In the Davis scale, the weight of the bars is all on one side of the centre of motion of the lever, and it necessarily follows that a balance-poise, capable of balancing the whole of the bars, was employed on the opposite side of the lever, in order to render the gravity of those bars ineffective which are out of use. The necessity for such a counterpoise tends to induce the making of the bars so small and the entire scale so delicate as to be less efficient and reliable than ours.

In our scale, the bars may be made of any thickness and weight which are judged expedient, and each, when thrust into its proper position, with its stop adjusted as near the centre of the lever as possible, is of no effect in inclining the frame M in either direction. Only that bar which is partially drawn out produces any influence on the scale.

Although we prefer exactly the above-described construction, it is not absolutely necessary that the bars be thus accurately adjusted in order to render available a great part of the advantages of our improved arrangement, because, if they are only partially balanced, the mass of the counter-weight may be very materially reduced.

E is an adjustable poise, which is used, in addition to the others before described, to compensate for the changes in position of the adjustable stops $a\ b\ c\ d$. It will be observed that these stops necessarily possess considerable weight. We prefer to so construct and proportion the parts that when these stops are adjusted as far to the left on their respective bars as they are capable of going, the adjustable poise E requires to be adjusted near its extreme right position in order to make the scale balance with no load, and, as the stops are each adjusted to the right, the poise E must be moved to the left to an extent determined by experiment, so as to make the scale balance when all the bars are thrust in.

F is a small adjustable weight, which is adapted to traverse on the frame M, as represented, and to be adjusted independent of any of the other weights.

It will be understood that the links by which the beam or frame M is suspended are indicated by G, and the links by which the gravity of the load is transmitted from the proper levers to the beam M are indicated by H.

The beam M, with its connections, is subject to tilt with considerable energy, and to be considerably jarred by the concussions due to the sudden arresting of its motion at the end of its vibration. These concussions are liable to displace the bars.

We guard against these by two independent means. One is a notch, X, in each of the bars, which, when the bar is thrust in to its extreme position, rests on a knife-edge, indicated in dotted lines in the figure, and marked Y. This is a very efficient means of preventing the displacement of the bars when they are thrust in, but it is obviously inefficient when they are drawn out. To guard against the jarring of the bars out of place when they are drawn out, we provide springs I, secured by screws $i$ to the frame M, and pressing on pins J, which, bedded in corresponding holes in the frame M, transmit the force of the springs I to the sides of the respective bars. They each induce a friction against the respective bars, which is not sufficient to seriously increase the difficulty of moving the bars, when required, by the force of the hand, but is sufficient to prevent any movement by mere concussions.

The set-screws require to be screwed up with force to hold the adjustable stops $a\ b$, &c., against the concussions induced when they are drawn out and strike. We guard against any difficulty by setting up the screws O P Q R, which are tapped through the stops against bearing-pieces confined in the adjustable stops, as indicated by $o$ in figs. 6 and 7. The pieces are held between shoulders 1 and 2, as shown in fig. 7, and are held with great force against the respective bars by the pinching-screws, as represented.

This arrangement allows the holding with sufficient force without danger of indenting the points of the screws into the bars.

Having now fully described our invention, what we claim as new therein, and desire to secure by Letters Patent is as follows:

1. We claim the within-described arrangement of the adjustable bars A B, &c., so that a portion of the weight of each bar shall be distributed on each side of the centre of motion of the frame M, substantially as and for the purposes herein set forth.

2. We claim the stops $a\ b$ and balance-poise E, arranged relatively to each other and to the bars A B, &c., and frame M, substantially as and for the purpose herein specified.

3. We claim the friction-pieces J J, arranged as represented, and adapted to induce a constant friction against the bars A B, &c., substantially as and for the purposes herein specified.

4. We claim the adjustable bars A B, &c., beam of frame M m, stops a b, &c., and pinching-screws O P, &c., when provided with the bearing-pieces o, held loosely between the shoulders 1 and 2, and adapted to receive the force of the screw in confining the stops firmly, as herein specified.

In testimony whereof, we have hereunto set our names in presence of two witnesses.

THADDEUS FAIRBANKS.
HENRY FAIRBANKS.

Witnesses:
E. D. SANBORN,
A. N. FAIRBANKS.